United States Patent
Yaman et al.

(10) Patent No.: US 10,708,094 B2
(45) Date of Patent: Jul. 7, 2020

(54) TRANSMISSION FILTERING USING MACHINE LEARNING

(71) Applicants: NEC Laboratories America, Inc., Princeton, NJ (US); NEC Corporation, Tokyo (JP)

(72) Inventors: Fatih Yaman, Princeton, NJ (US); Shaoliang Zhang, Princeton, NJ (US); Eduardo Mateo Rodriguez, Tokyo (JP); Yoshihisa Inada, Tokyo (JP); Yue-Kai Huang, Princeton, NJ (US); Weiyang Mo, Sunnyvale, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/153,051

(22) Filed: Oct. 5, 2018

(65) Prior Publication Data

US 2019/0109736 A1    Apr. 11, 2019

Related U.S. Application Data

(60) Provisional application No. 62/569,723, filed on Oct. 9, 2017.

(51) Int. Cl.
| | | |
|---|---|---|
| *H04L 25/03* | (2006.01) | |
| *G06N 3/08* | (2006.01) | |
| *H04B 10/079* | (2013.01) | |
| *H04B 10/2513* | (2013.01) | |
| *H04B 10/2507* | (2013.01) | |
| *H04B 10/69* | (2013.01) | |

(52) U.S. Cl.
CPC ......... *H04L 25/03165* (2013.01); *G06N 3/08* (2013.01); *H04B 10/07953* (2013.01); *H04B 10/2507* (2013.01); *H04B 10/25133* (2013.01); *H04B 10/697* (2013.01); *H04B 2210/07* (2013.01)

(58) Field of Classification Search
CPC ........ H04L 25/03165; H04B 10/07953; H04B 2210/07; H04B 10/697; H04B 10/25133; H04B 10/2507; G06N 3/08
See application file for complete search history.

(56) References Cited

U.S. PATENT DOCUMENTS

| | | | |
|---|---|---|---|
| 2004/0047639 A1* | 3/2004 | McAlexander | H04B 10/60 398/202 |
| 2010/0232796 A1* | 9/2010 | Cai | H04B 10/677 398/79 |
| 2015/0249554 A1* | 9/2015 | Vaman | H04L 25/03019 375/232 |

OTHER PUBLICATIONS

Jinno, M. et al., "Distance-Adaptive Spectrum Resource Allocation in Spectrum-Sliced Elastic Optical Path Network" IEEE Communications Magazine (Aug. 2010) pp. 138-145.

Paolucci, F. et al., "Filter Optimization in SDN-based Flexgrid Networks" Conference Paper (Mar. 2014) pp. 1-3.

(Continued)

*Primary Examiner* — Leslie C Pascal
(74) *Attorney, Agent, or Firm* — Joseph Kolodka (57) ABSTRACT

Systems and methods for transmission filtering are provided. A receiver includes an input coupled to a transmission line to receive distorted optical symbols. A distortion filter is coupled to the input to replace the distorted optical symbols with predicted symbols using a trained neural network. A decoder is coupled to the distortion filter to decode the predicted symbols.

20 Claims, 8 Drawing Sheets

(56) References Cited

OTHER PUBLICATIONS

Wang, D. et al., "System impairment compensation in coherent optical communications by using a bio-inspired detector based on artificial neural network and genetic algorithm" Optics Communications (Apr. 2017) pp. 1-12, vol. 399.

Zibar, D. et al., "Nonlinear impairment compensation using expectation maximization for dispersion managed and unmanaged PDM 16-QAM transmission" Optics Express (Dec. 2012) pp. 1-16, vol. 20, No. 6.

Zibar, D. et al., "Machine Learning Techniques in Optical Communication" Journal of Lightwave Technology (Mar. 2016) pp. 1442-1452, vol. 34, No. 6.

* cited by examiner

TRANSMISSION FILTERING USING MACHINE LEARNING

RELATED APPLICATION INFORMATION

This application claims priority to U.S. Provisional Application No. 62/569,723, filed on Oct. 9, 2017, incorporated herein by reference herein its entirety.

BACKGROUND

Technical Field

The present invention relates to transmission filtering methods and devices and more particularly, to symbol filter systems and methods that employ trained neural networks to compensate for filter narrowing effects.

Description of the Related Art

When optical signals propagate over an optical transmission system, inter-symbol interference (ISI) may occur in which one symbol interferes with other symbols. Thus, ISI introduces additional noise into the optical signals and makes the transmission systems less reliable. A main type of ISI is filter narrowing, which happens when narrower filters than the data rate along an optical path are used to increase spectral efficiency. The cascading filtering effect heavily affects the shape of the transmitted signal, and the received signal at the receiver is highly distorted.

SUMMARY

According to aspects of the present invention, systems and methods for transmission filtering are provided. A receiver includes an input coupled to a transmission line to receive distorted optical symbols. A distortion filter is coupled to the input to replace the distorted optical symbols with predicted symbols using a trained neural network. A decoder is coupled to the distortion filter to decode the predicted symbols.

A method for transmission filtering includes receiving distorted symbols over a transmission line; identifying the distorted symbols using a neural network, which outputs predicted symbols; and filtering the distorted symbols by decoding the predicted symbols in place of the distorted symbols.

Another method for transmission filtering includes inputting symbols received over a transmission system to a neural network as an input; adjusting weights to program the neural network to yield transmitted symbols transmitted over the transmission system; and mitigating filter narrowing over a transmission line by: identifying distorted symbols over the transmission line using the neural network, which outputs predicted symbols; and filtering the distorted symbols by decoding the predicted symbols in place of the distorted symbols.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with aspects of the present invention, systems and methods are provided that employ a neural network-based machine learning approach to compensate for filter narrowing effects. This approach can only employ transmission and receiver symbols to train the neural network, and then uses the neural network to mitigate/compensate for the filter narrowing. The neural network does not need system information (e.g. baud rate, number of filters, filter bandwidth, optical signal to noise ratio (OSNR), etc.) and therefore provides systems with achievable performance improvements with a high degree of independence.

Aspects of the present invention construct a neural network and predict filter narrowing induced inter-symbol interference (FN-ISI) to optimize the system performance. The predicted FN-ISI can be employed to adjust the interpretation of symbols to improve validation of the symbols during information (symbol) transmission. The neural network can be trained using known transmissions and can employ the use of different neural network architectures to achieve a best training performance and a best validation performance. The trained neural network can be employed to predict the transmission symbols from distorted symbols at a receiver of the transmission system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
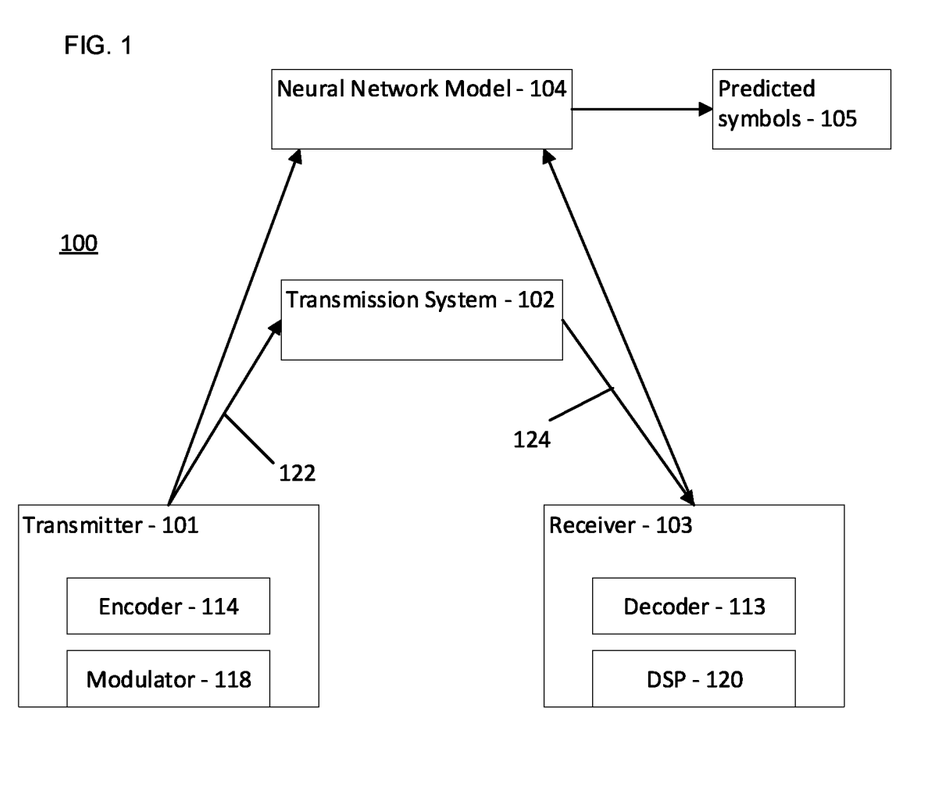
FIG. 1 is a block/flow diagram illustrating a high-level system/method for training a neural network for symbol distortion filtering in accordance with the present invention.

Referring now in detail to the figures in which like numerals represent the same or similar elements and initially to FIG. 1, a high-level system 100 for symbol transmission is illustratively depicted in accordance with one embodiment of the present invention. The system 100 can be employed using any transmission system 102 including wired or wireless systems. However, in one embodiment, transmission system 102 includes an optical transmission system. Optical transmission systems can include fiber optic networks and can be employed in a plurality of applications, such as fiber to the home, trans-oceanic transmission lines, printed wiring board transmissions, etc. The system 100 can employ single mode fiber(s), multi-mode fiber(s) or any other optical transmission media.

It should be understood that the transmission system 102 can include additional components, such as splitters, optical to electrical converters, electrical to optical converters, repeaters, multiplexers, etc. The transmission system 102 can include a single line or can include an entire network.

A transmitter 101 can include an encoder 114 for encoding data. For example, a pair of data signals (dx and dy) can be encoded using an M-dimensional constellation to generate a set of M drive signals. An encoding scheme of the encoder 114 in which an N-symbol constellation is defined in an M-dimensional space can include data words that are encoded as one or more symbols of the constellation. These symbols can then be modulated by the transmitter onto the available dimensions of the optical carrier (102) in one or more signaling intervals of duration T.

The drive signals are then supplied to a modulator 118 for modulating respective dimensions of, e.g., a continuous wave (CW) optical carrier in accordance with the drive signals. In the example, a pair of data signals (e.g., dx and dy) may be encoded as M=4 drive signals, which are then used to modulate two dimensions (e.g., phase and amplitude, or I and Q) of each orthogonal polarization of the optical carrier. The CW carrier may be generated by a laser, and the modulator 118 may be implemented using, e.g., a phase modulator, variable optical attenuator, Mach-Zehnder interferometers, etc. The modulator 118 generates symbols for optical signal transmission. A modulated optical signal 122 at the output of the modulator is transmitted through an optical fiber link in the transmission system 102 to a receiver 103.

The receiver 103 is configured to receive and detect the transmitted data signals (symbols). The receiver 103 can include a decoder 113. The decoder 113 can include a polarization beam splitter for splitting the received optical signal into received X and Y polarizations, an optical hybrid for separately mixing the X and Y polarizations with a local oscillator and a set of photodetectors for detecting the optical power of each of the mixing products generated by the optical hybrid. An Analog to Digital (A/D) converter can be employed to sample each photodetector current, and the resulting sample streams, which represent one of the modulated dimensions of the optical carrier field, which are processed by a Digital Signal Processor (DSP) 120 in accordance with the M-dimensional constellation to generate recovered signals Rx and Ry that correspond with the transmitted data signals dx and dy.

During training, the system 100 includes a neural network model 104 that receives the symbols output from the transmitter 101 and from the receiver 103. Since the received symbols at the receiver 103 have been transmitted over the transmission system 102, the symbols have undergone distortion, an in particular intersymbol interference (ISI). ISI is a form of distortion of a signal in which one symbol interferes with subsequent symbols. This makes previously transmitted symbols have a similar effect as noise, making the communication less reliable. The spreading of the pulse beyond its allotted time interval causes it to interfere with neighboring pulses. ISI is usually caused by multipath propagation or the inherent linear or non-linear frequency response of a communication channel causing successive symbols to "blur" together or distort.

The presence of ISI in the system 100 introduces errors in the decoder 113 at the receiver output. This distortion or narrowing effects (e.g., the effects of ISI) are to be minimized to deliver the digital data to its destination with the smallest error rate possible.

The neural network model 104 is employed in a machine learning approach, which is used for the mitigation of filter narrowing induced inter-symbol interference (FN-ISI). Based on training symbols, the neural network 104 can predict the function of FN-ISI and therefore compensate for the FN-ISI for the new receiver symbols. The trained model 104 under a particular system condition (e.g., a particular OSNR value) is applicable to compensate for FN-ISI under other system conditions (e.g., different OSNR levels). Moreover, in a useful embodiment, the neural network 104 only uses the transmitter symbols and receiver symbols to train the function of FN-ISI, and therefore does not need additional system information. No reconfiguration of the signal spectrum or the filter is needed. This improves the spectral efficiency compared to conventional systems.

The transmitter 101 sends transmission symbols 122 into the transmission system 102, which includes multiple bandwidth-limited filters that distort the transmitter symbols 122 resulting in distorted symbols 124. The distorted symbols 124 are received at the receiver 103. In addition, the transmission symbols 122 and the distorted symbols 124 are sent into the neural network model 104 as a part of training data. The neural network model 104 then uses the transmission symbols 122 and distorted symbols 124 as its output and input, respectively, to train a function of FN-ISI of the transmission system 102. When training is done, the trained neural network 104 can be used to predict the transmission symbols 122 from the distorted symbols 124 to provide predicted symbols 105. The predicted symbols 105 can be provided to a decoder or received to decode the symbols that have been adjusted or replaced by the neural network model 104.

The training of the model 104 to handle distorted symbols can better interpret the symbols. ISI artifacts can now be readily deciphered and filtered out using the neural network model 104. Ideally, the predicted symbols 105 will include the transmission symbols 122.

Figure 2:
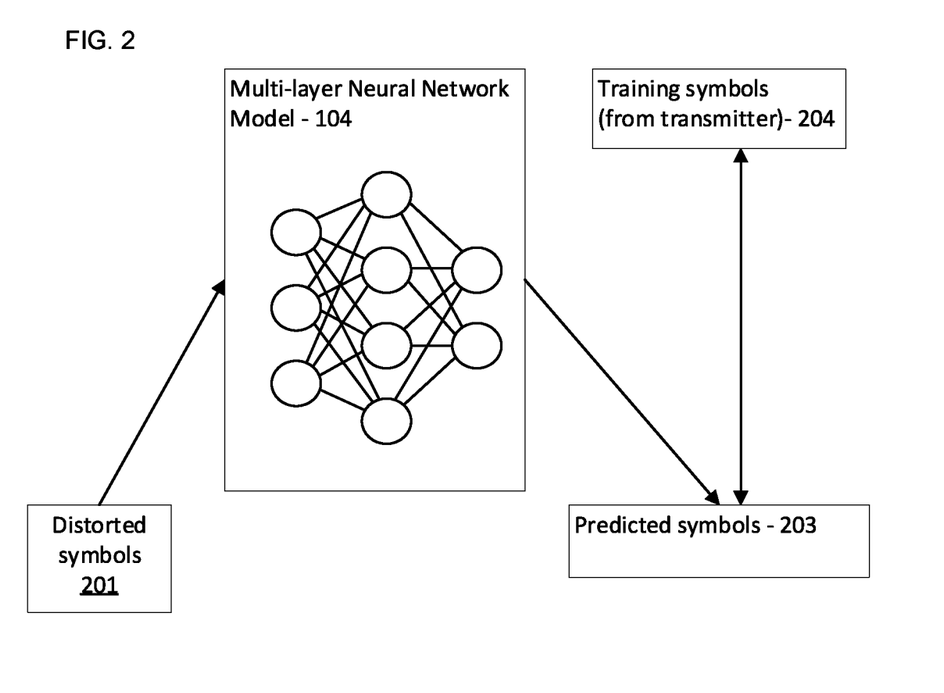
FIG. 2 is a block/flow diagram illustrating a high-level system/method for training the neural network of FIG. 1 in greater detail for symbol distortion filtering in accordance with the present invention.

Referring to FIG. 2, the neural network model 104 for FN-ISI mitigation is described in greater detail. The input of a multi-layer neural network 104 includes the distorted symbols 201 at the receiver due to FN-ISI of the transmission system 102 at the receiver 103. The output of the neural network 202 is the transmission symbols at the transmitter 204, respectively. The relationship between the output and input (e.g., the function of FN-ISI) can be learned by using backpropagation training on the training data, trying to minimize the differences between predicted transmission symbols 203 and the actual transmission symbols 204.

The neural network model 104 includes a large number of highly interconnected processing elements (called "neurons") working in parallel to solve specific problems. Learning by the neural network model 104 involves adjustments to weights that exist between the neurons. The neural network model 104 is configured for a specific application, e.g., learning a function for decoding distorted symbols through the learning process.

Figure 3:
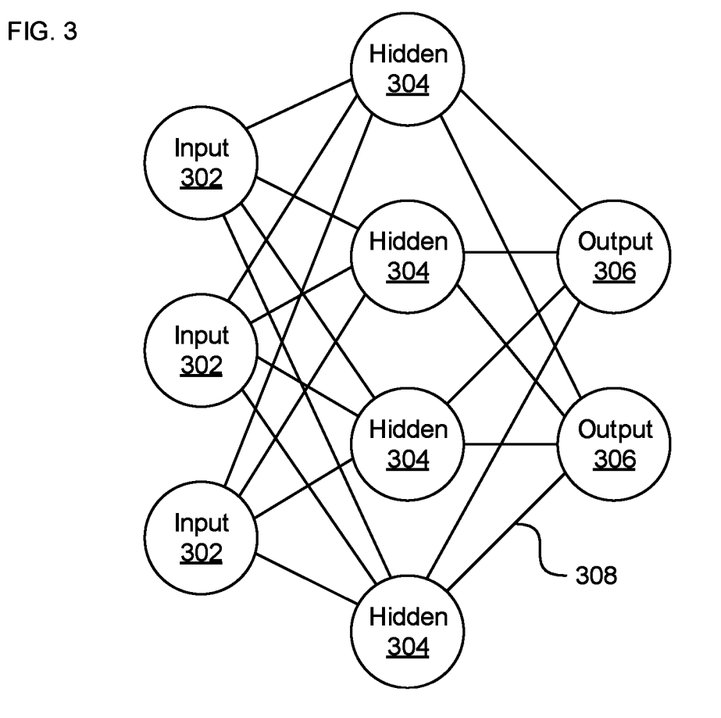
FIG. 3 is a schematic diagram illustrating a neural network in accordance with the present invention.

Referring to FIG. 3, a neural network is illustratively shown. The neural network model 104 derives meaning from complicated or imprecise data and can be used to extract patterns and detect trends that are too complex to be detected by humans or other computer-based systems. The structure of the neural network model 104 includes input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304, with weighted connections 308 between the layers. There may be any number of layers of hidden neurons 304, and as well as neurons that perform different functions. There exist different neural network structures as well, such as convolutional neural network, maxout network, etc., which can be employed in accordance with the present embodiments.

A set of output neurons 306 accepts and processes weighted input from the last set of hidden neurons 304. This represents a "feed-forward" computation, where information propagates from input neurons 302 to the output neurons 306. Upon completion of a feed-forward computation, the output is compared to a desired output available from training data. The error relative to the training data is then processed in "feed-back" computation, where the hidden neurons 304 and input neurons 302 receive information regarding the error propagating backward from the output neurons 306. Once the backward error propagation has been completed, weight updates are performed, with the weighted connections 308 being updated to account for the received error. The error formulations once-trained provide the decoding formula for the transmission system 102.

It should be understood that any number of these stages may be implemented, by interposing additional layers of arrays and hidden neurons 304. It should also be noted that some neurons may be constant neurons, which provide a constant voltage to the array. The constant neurons can be present among the input neurons 302 and/or hidden neurons 304 and are only used during feed-forward operation.

During back propagation, the output neurons 306 provide a voltage (or other characteristic) back across the weighted connections 308. An output layer compares the generated network response to training data and computes an error. The error is applied to the array as a voltage pulse, where the height and/or duration of the pulse is modulated proportional to the error value. In this example, the back-propagation travels through the entire neural network 104 until all hidden neurons 304 and the input neurons 302 have stored an error value.

During weight update mode, after both forward and backward passes are completed, each weight is updated proportional to the product of the signal passed through the weight during the forward and backward passes. Update signal generators provide pulses in both directions (though note that, for input and output neurons, only one direction will be available). The shapes and amplitudes of the pulses from update generators are configured to change a state of the weights, such that the resistance of the weights is updated.

It should be noted that the three modes of operation, feed forward, back propagation, and weight update, do not overlap with one another. However, because the different phases do not overlap, there will necessarily be some form of control mechanism within in the neurons to control which components are active. It should therefore be understood that there may be switches and other structures that are not shown in the neurons to handle switching between modes.

The weights may be implemented in software or in hardware, for example using relatively complicated weighting circuitry or using resistive adjustable devices (e.g., resistive processing unit (RPU)).

Figure 4:
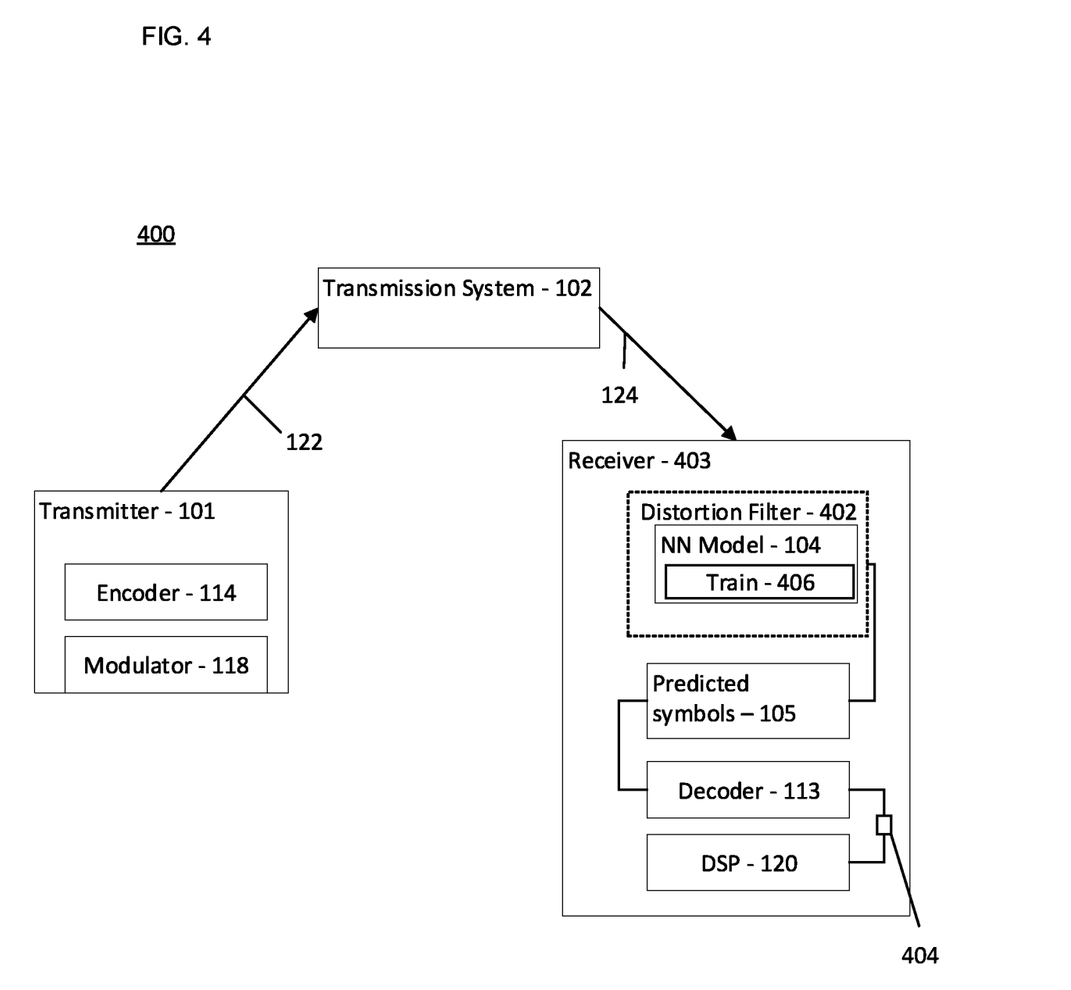
FIG. 4 is a block/flow diagram illustrating a system/method for distortion filtering transmission symbols in accordance with the present invention.

Referring to FIG. 4, a system 400 includes a receiver 403 having a distortion filter 402. The distortion filter 402 includes the trained model 104 and is employed for predicting the transmission symbols for new distorted symbols at the receiver 403 to mitigate FN-ISI. The neural network (NN) model 104 for FN-ISI mitigation improves system performance by outputting predicted symbols making it easier and more accurate to decode the symbols by the decoder 113. This approach only needs historic transmission symbols and receiver symbols to train the neural network 104. Then, the trained neural network 104 can be employed to compensate for FN-ISI.

This approach does not need additional low-level information such as baud rate, number of filters, filter bandwidth, OSNR, etc. The trained neural network 104 has learned the function of the FN-ISI and can predict the transmission symbols from distorted symbols at the receiver 103. However, in one optional embodiment, the receiver 103 can include a feedback sensor which can react to error codes or other feedback criteria (e.g., Q-factor) to determine if further training of the NN model 104 is needed. For example, if the error rate increases above a threshold, additional training may be needed. The training can be performed in a training mode 406 activated in accordance with the feedback sensor 404. It should be understood that the feedback sensor 404 may be located between any of the component or software modules and can employ any useful metric to measure performance.

In another embodiment, the neural network model 104 can be replaced with a function or algorithm gleaned from the neural network training. In this embodiment, little memory or processing capability is needed. In one embodiment, a lookup table or table may be employed to provide predicted symbols based on distorted symbols.

Figure 5:
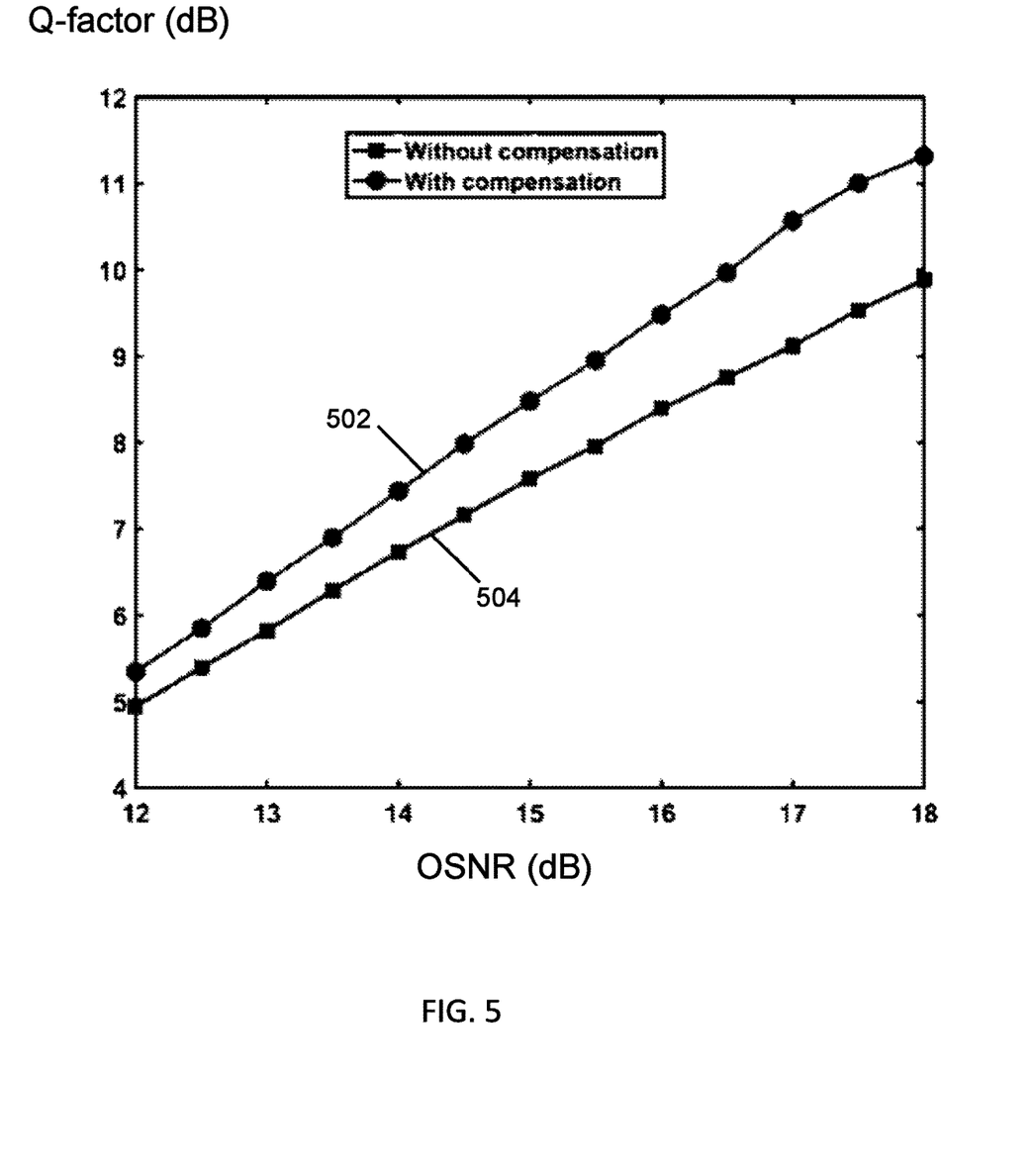
FIG. 5 is a plot of quality factor (dB) versus optical signal to noise ratio (OSNR) (dB) showing one trace with distortion mitigation/compensation in accordance with the present invention and another trace without distortion mitigation.

Referring to FIG. 5, an exemplary processing system 500 to which the present invention may be applied is shown in accordance with one embodiment. The processing system 500 can be employed for training a neural network in or in conjunction with a distortion filter 524. The neural network can be implemented in hardware (e.g., an RPU device) or software. The processing system 500 can also be employed as or with a receiver device (403, FIG. 4). The processing system 500 includes at least one processor (CPU) 502 operatively coupled to other components via a system bus 505. A cache 506, a Read Only Memory (ROM) 508, a Random-Access Memory (RAM) 510, an input/output (I/O) adapter 520, a sound adapter 530, a network adapter 540, a user interface adapter 550, and a display adapter 560, are operatively coupled to the system bus 505.

A first storage device 522 and the distortion filter 524, which can be stored in memory, are operatively coupled to system bus 505 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

An optional speaker 532 is operatively coupled to system bus 505 by the sound adapter 530. A receiver 542 is operatively coupled to system bus 505 by network adapter 540. In some embodiments, a transceiver or transmitter may also be employed and connected to the system bus 505 through a network adapter. A display device 562 can optionally be included and operatively coupled to system bus 505 by display adapter 560.

A first user input device 552, a second user input device 554, and a third user input device 556 are operatively coupled to system bus 505 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of optical, wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present invention provided herein.

Figure 6:
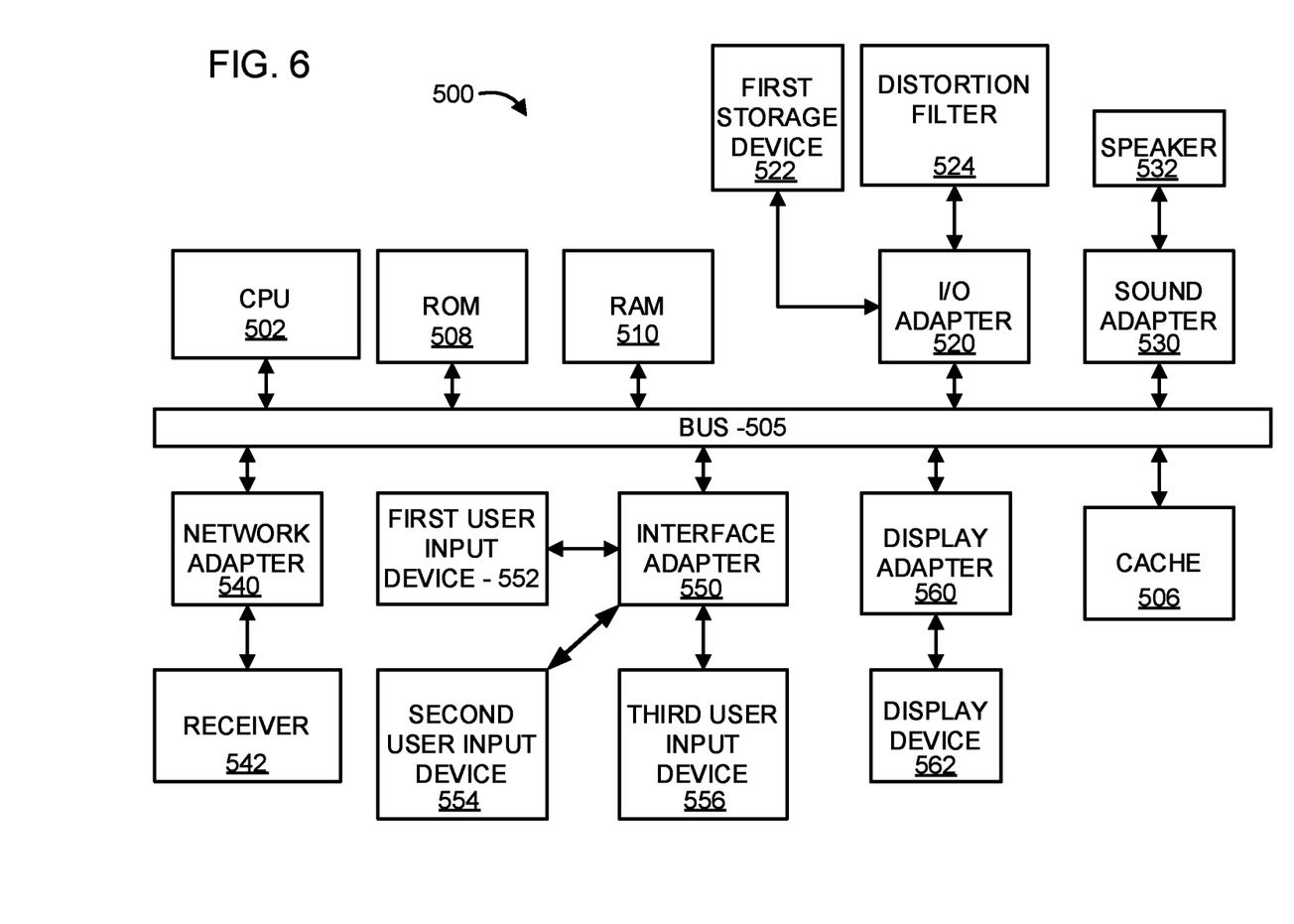
FIG. 6 is a block/flow diagram illustrating a system/method for neural network training and/or distortion filtering in accordance with one embodiment of the present invention.

Referring to FIG. 6, quality factor (Q-factor) in dB is measured and plotted against OSNR (in dB) for a same transmission system. One trace 502 shows the transmission system with mitigation/compensation employing the distortion filter in accordance with the present embodiments. Another trace 504 shows the transmission system without mitigation. Over the same OSNR range the distortion filter provides a Q-factor of at least ⅓ dB or greater and the benefits increase with greater OSNR. In one embodiment, Q-factor can be employed as a feedback measurement to determine whether further training of the NN model is needed.

Figure 7:
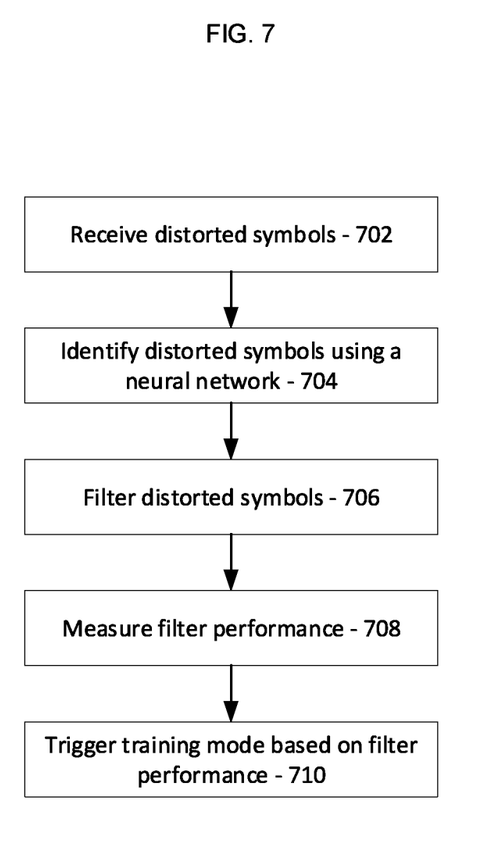
FIG. 7 is a flow diagram illustrating methods for distortion filtering transmission symbols in accordance with one embodiment of the present invention.

Referring to FIG. 7, methods for transmission filtering are illustratively shown. In block 702, distorted symbols are received over a transmission line. The transmission line can include an optical transmission line or system, although wired or wireless systems can also be employed.

In block 704, the distorted symbols are identified using a neural network, which outputs predicted symbols. In useful embodiments, the neural network is trained independently of system information using only transmitted and received symbols. This makes the model independent of other system information, e.g., baud rate, number of filters, filter bandwidth, OSNR and/or other system information.

In block 706, the distorted symbols are filtered by decoding the predicted symbols in place of the distorted symbols. The distorted symbols filtering compensates for filter narrowing effects of the transmission line or system. The distorted symbols can be replaced/filtered to predict filter narrowing induced inter-symbol interference (FN-ISI).

In block 708, performance of the predicted symbols can be measured using a feedback sensor. The performance measurement can include measuring an error rate, Q-factor, line or channel degradations, etc.

In block 710, a training mode can be triggered by the feedback sensor if performance of the predicted symbols drops below a threshold. The threshold can be user set, set by default or set automatically.

Figure 8:
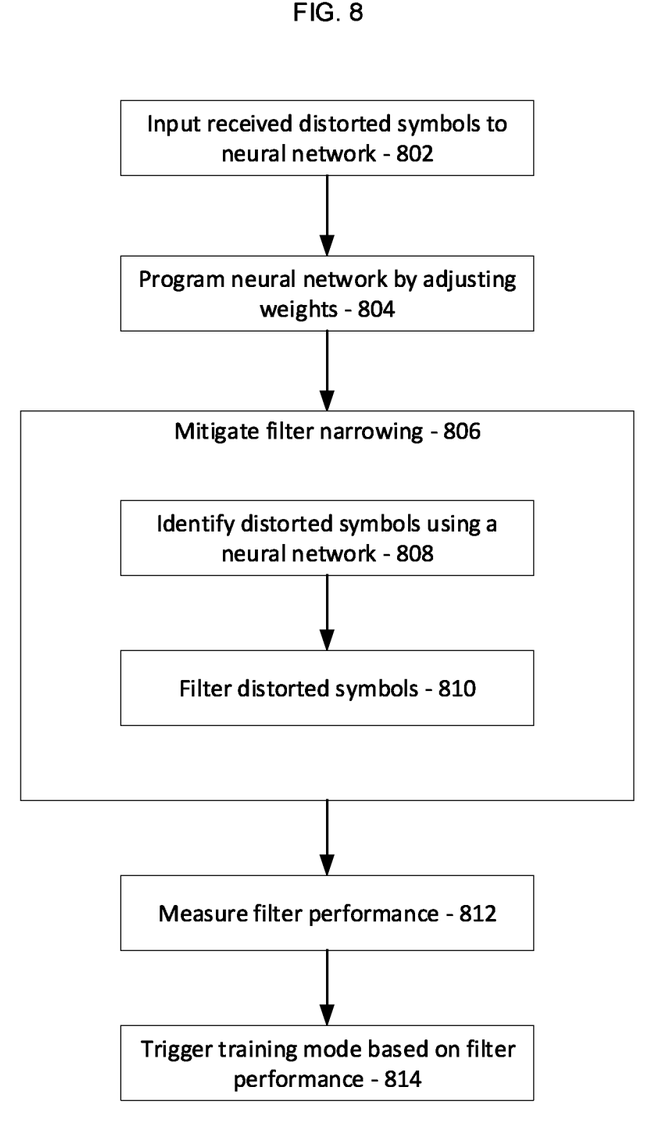
FIG. 8 is a flow diagram illustrating methods for distortion filtering transmission symbols with initial or ongoing training in accordance with another embodiment of the present invention.

Referring to FIG. 8, methods for transmission filtering including neural network training are illustratively shown. In block 802, symbols received over a transmission system are input to a neural network as an input. In block 804, the neural network is programmed by adjusting weights (in a weight array) of the network to yield transmitted symbols transmitted over the transmission system. In block 806, filter narrowing due to a transmission line or system (e.g., FN-ISI) is mitigated. In block 808, distorted symbols received over the transmission line are identified using the neural network, which outputs predicted symbols. In block 810, the distorted symbols are filtered by predicting the transmitted symbols and substituting the predicted symbols in place of the distorted symbols.

In block 812, the neural network is trained independently of system information, where system information includes one or more of: baud rate, number of filters, filter bandwidth, OSNR, etc.

In block 814, performance of the predicted symbols can be measured using a feedback sensor. The performance measurement can include measuring an error rate, Q-factor, line or channel degradations, etc.

In block 816, a training mode can be triggered by the feedback sensor if performance of the predicted symbols drops below a threshold. The threshold can be user set, set by default or set automatically.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A receiver, comprising:
    an input coupled to a transmission line to receive distorted optical symbols, the distorted optical symbols being distorted using a plurality of bandwidth-limited filters configured to distort transmitted transmitter signals;
    a distortion filter coupled to the input to replace the distorted optical symbols with predicted symbols using a trained neural network, the neural network being trained for functions of filter narrowing induced inter-symbol interference (FN-ISI) using only transmitter symbols and receiver symbols independently of system information; and
    a decoder coupled to the distortion filter configured to decode the predicted symbols.

2. The receiver as recited in claim 1, wherein the distortion filter compensates for filter narrowing effects.

3. The receiver as recited in claim 1, wherein the distortion filter predicts filter narrowing induced inter-symbol interference (FN-ISI).

4. The receiver as recited in claim 1, wherein the trained neural network is trained independently of system information, where system information includes one or more of: baud rate, number of filters, filter bandwidth, and/or optical signal to noise ratio (OSNR).

5. The receiver as recited in claim 1, further comprising a feedback sensor to measure performance of the predicted symbols.

6. The receiver as recited in claim 5, further comprising a training mode triggered by the feedback sensor if performance of the predicted symbols drops below a threshold.

7. A method for transmission filtering in a receiver, comprising:
    receiving distorted optical symbols over a transmission line, the distorted optical symbols being distorted using a plurality of bandwidth-limited filters configured to distort transmitted transmitter signals;
    identifying the distorted symbols using a trained neural network, which outputs predicted symbols, the neural network being trained for functions of filter narrowing induced inter-symbol interference (FN-ISI) using only transmitter symbols and receiver symbols independently of system information; and
    preventing filter narrowing by filtering the distorted symbols by decoding the predicted symbols in place of the distorted symbols.

8. The method as recited in claim 7, wherein filtering the distorted symbols compensates for filter narrowing effects.

9. The method as recited in claim 7, wherein filtering the distorted symbols predicts filter narrowing induced inter-symbol interference (FN-ISI).

10. The method as recited in claim 7, wherein the transmission line includes an optical transmission line.

11. The method as recited in claim 7, wherein the neural network is trained independently of system information, where system information includes one or more of: baud rate, number of filters, filter bandwidth, and/or optical signal to noise ratio (OSNR).

12. The method as recited in claim 7, further comprising measuring performance of the predicted symbols using a feedback sensor.

13. The method as recited in claim 12, wherein measuring performance includes measuring an error rate.

14. The method as recited in claim 12, wherein measuring performance includes measuring a quality factor.

15. The method as recited in claim 12, further comprising triggering a training mode by the feedback sensor if performance of the predicted symbols drops below a threshold.

16. A method for transmission filtering in a receiver, comprising:
    inputting symbols received over a transmission system to a trained neural network as an input;
    adjusting weights to program the neural network to yield transmitted symbols transmitted over the transmission system, the transmitted symbols being distorted into distorted optical symbols using a plurality of bandwidth-limited filters configured to distort transmitted transmitter signals; and
    mitigating filter narrowing over a transmission line by:
        identifying distorted symbols over the transmission line using the trained neural network, which outputs predicted symbols, the neural network being trained for functions of filter narrowing induced inter-symbol interference (FN-ISI) using only transmitter symbols and receiver symbols independently of system information; and
        filtering the distorted symbols by decoding the predicted symbols in place of the distorted symbols.

17. The method as recited in claim 16, wherein filtering narrowing includes filter narrowing induced inter-symbol interference (FN-ISI).

18. The method as recited in claim 16, wherein the neural network is trained independently of system information, where system information includes one or more of: baud rate, number of filters, filter bandwidth, and/or optical signal to noise ratio (OSNR).

19. The method as recited in claim 16, further comprising measuring performance of the predicted symbols using a feedback sensor.

20. The method as recited in claim 19, further comprising triggering a training mode by the feedback sensor if performance of the predicted symbols drops below a threshold.

* * * * *